United States Patent [19]
Garrett et al.

[11] Patent Number: 5,156,676
[45] Date of Patent: * Oct. 20, 1992

[54] MANUFACTURE OF CEMENT CLINKER IN LONG ROTARY KILNS BY THE ADDITION OF VOLATILE FUEL ELEMENTS DIRECTLY INTO THE CALCINING ZONE OF THE ROTARY KILN

[75] Inventors: Hoke M. Garrett, 213 Hampton Ct., Santa Rosa, Calif. 95409; Eric Hansen, Swanee, Kans.

[73] Assignees: Hoke M. Garrett, Santa Rosa, Calif.; Ash Grove Cement Company, Overland Park, Kans.; Cadence Chemical Resources, Inc., Michigan City, Ind.

[*] Notice: The portion of the term of this patent subsequent to Jun. 16, 2009 has been disclaimed.

[21] Appl. No.: 696,624

[22] Filed: May 7, 1991

Related U.S. Application Data

[63] Continuation-in-part of Ser. No. 509,378, Apr. 13, 1990, Pat. No. 5,122,189.

[51] Int. Cl.$^5$ .............................................. C04B 7/36
[52] U.S. Cl. ................................ 106/745; 106/757; 106/758; 106/755
[58] Field of Search ................ 106/745, 757, 758, 755

[56] References Cited

U.S. PATENT DOCUMENTS

| | | |
|---|---|---|
| 274,288 | 3/1883 | De Smedt . |
| 1,132,527 | 3/1915 | Schneider . |
| 1,323,294 | 12/1919 | Lesley . |
| 1,746,944 | 2/1930 | Hyde . |
| 1,904,699 | 4/1933 | Singmaster . |
| 2,090,363 | 8/1937 | Wendeborn . |
| 2,090,868 | 8/1937 | Hyde . |
| 2,991,187 | 7/1961 | Sellers et al. . |
| 3,127,455 | 3/1964 | Culbertson et al. . |
| 3,135,618 | 6/1964 | Friese . |
| 3,357,689 | 12/1967 | Arnesen et al. . |
| 3,716,387 | 2/1973 | Simmons et al. . |
| 4,022,626 | 5/1977 | Garrett et al. . |
| 4,081,285 | 3/1978 | Pennell . |
| 4,110,121 | 8/1978 | Rechmeier et al. . |
| 4,179,263 | 12/1979 | Jung et al. . |
| 4,238,237 | 12/1980 | Jarrett et al. . |
| 4,256,503 | 3/1981 | Tsuda et al. . |
| 4,295,823 | 10/1981 | Ogawa et al. . |
| 4,295,825 | 10/1981 | Chielens et al. . |
| 4,627,877 | 12/1986 | Ogawa et al. . |
| 4,640,681 | 2/1987 | Steinbiss et al. . |
| 4,678,514 | 7/1987 | Deyhle et al. . |
| 4,723,093 | 3/1988 | Hansen et al. . |
| 4,850,290 | 7/1989 | Benoit et al. . |
| 4,894,983 | 1/1991 | Enkegaard . |
| 4,964,914 | 10/1990 | Leath . |

FOREIGN PATENT DOCUMENTS 237182 7/1925 United Kingdom .

OTHER PUBLICATIONS

Naredi, ZKG International, pp. 185–189 (1983).
Garrett, H. M., "Precalciners Today—A Review", *Rock Products* (Jul. 1985), pp. 39–61.
Naredi, I. R. "Using solid fuels in supplementary firing systems for rotary cement kilns", *Refra Symposium '82* (1982), pp. 21–42.
Hansen, E. R. "New Way to Burn Hazardous Waste", *Rock Products* (Apr. 1990), pp. 41–43.

*Primary Examiner*—Karl Group
*Attorney, Agent, or Firm*—Burns, Doane, Swecker & Mathis

[57] ABSTRACT

Methods are disclosed for the use of inexpensive volatile fuels in the calcining zone of a cement kiln during the manufacture of cement clinker in a rotary vessel.

30 Claims, 1 Drawing Sheet

MANUFACTURE OF CEMENT CLINKER IN LONG ROTARY KILNS BY THE ADDITION OF VOLATILE FUEL ELEMENTS DIRECTLY INTO THE CALCINING ZONE OF THE ROTARY KILN

CROSS-REFERENCE TO RELATED APPLICATIONS

This application is a continuation-in-part of U.S. Ser. No. 07/509,378 filed Apr. 13, 1990 now U.S. Pat. No. 5,122,189, which is incorporated herein in its entirety by reference.

BACKGROUND OF THE INVENTION

1. Field of the Invention

This invention relates to the manufacture of cement clinker in long rotary kilns. In particular, this invention is directed to the manufacture of cement clinker in conventional long wet or dry rotary kilns wherein volatile fuel elements are added directly into the calcining zone of such rotary kilns.

2. State of the Art

Cement clinker may be produced by heating calcareous material with an argillaceous material or other forms of silica, alumina, and iron oxide which may additionally include minor amounts of materials indigenous to these raw materials, at temperatures on the order of about 2300°–2900° F. to bring about the chemical reactions necessary to convert the ingredients to calcium silicates, i.e., cement clinker.

The literature is replete with processes by which the calcining and clinkering of cement ingredients can be accomplished. For example, cement raw materials may be mixed with solid fuel and burned with air on a grate to provide a final clinker (e.g., U.S. Pat. Nos. 2,090,363 and 3,135,618) or cement raw materials mixed with fuel may be sintered with air on a grate or the like and the sintered intermediate then clinkered in a rotary kiln, blast furnace or the like (e.g., U.S. Pat. Nos. 1,746,944 and 1,904,699). In still other alternatives, cement raw materials and fuel may be formed into shapes such as pellets, briquets and the like and then burned and clinkered (e.g., U.S. Pat. Nos. 274,288, 1,132,527, 2,904,455, 2,991,187 and 3,127,455).

In one widely used commercial process to which this invention is directed, calcining and clinkering of cement raw materials is accomplished by passing finely divided raw materials through a rotating inclined rotary vessel termed a conventional long wet or dry rotary kiln. In this process, the requisite temperatures are achieved by burning fuel such as gas, fuel oil, powdered coal, coke or the like, singularly or in combinations in the gaseous atmosphere of the kiln, with the gases moving counter-current to the solids through the kiln. Inasmuch as high temperatures are required for the process, fuel costs constitute a significant factor in the ultimate cost of the product. In particular, it is art recognized that the most significant factor in overall fuel costs for the production of cement clinker is the highly endothermic calcining step of converting calcium carbonate to calcium oxide with the concomitant generation of carbon dioxide. This step alone accounts for more than 70% of the theoretical energy requirement of a typical dry process.

Methods of reducing fuel costs, especially the fuel costs for the calcining step, accordingly have been and still remain a major focus for the industry. One recent method for realizing substantial fuel savings is the use of a precalciner. Precalciners contain a special chamber to allow combustion of up to 60% of the total process fuel in suspension with preheated raw materials from the third stage of a conventional four stage suspension preheater system to rapidly (typically 1–3 seconds) calcine about 90% percent of the calcium carbonate to calcium oxide.

In particular, in the precalciner, the raw materials are intimately suspended in hot air along with finely divided fuel components. The hot air initially employed in the precalciner is typically "recovered heat" derived from parts of the cement making process, e.g., the clinker cooler, etc. The fuel components are employed to generate additional heat so as to calcine approximately 90% of the calcium carbonate to calcium oxide. Because of the intimate contact between the suspended particles and the burning fuel, excellent thermal efficiency is achieved resulting in substantial fuel savings (among other benefits) as compared to the conventional long wet or dry rotary kilns. Because all of the calcium carbonate has not been calcined, a final calcining zone is still required in the kiln. However, this zone is substantially reduced as compared to the calcining zones of conventional long wet or dry rotary kilns. See, Garrett, Rock Products, "Precalciners Today—A Review", pp. 39 et seq., July 1985, for a detailed description of precalciners.

Another method of improving thermal efficiency and reducing fuel costs is disclosed by Garrett, U.S. Pat. No. 4,022,629. This reference discloses the use of low volatile, high ignition temperature, solid fuel components which can be added to the kiln either with the feed at the feed-end of the kiln or at any point in the process up to and including the calcining zone to provide for combustion predominantly within the calcining zone. Because the solid fuel particles are in the interior and/or on the surface of the bed itself and in contact with the cement raw materials, heat from this fuel is transferred by conduction, convection and radiation which results in enhanced thermal efficiency as compared to the thermal efficiency achieved by heating the feed with hot gases passing above the feed bed.

Still another method of reducing fuel costs is disclosed by Benoit et al., U.S. Pat. No. 4,850,290. The process disclosed by this reference employs combustible hazardous wastes including volatile hazardous wastes which have been containerized so as to render the wastes non-volatile during the addition period and accordingly, safe to handle. The entire containerized waste module is added directly into the calcining zone of the kiln via a drop tube originating from a port at an appropriate location on the kiln as disclosed in this reference. Upon addition of the containerized waste module to the kiln, the module is embedded in the feed and eventually combusts. Because of the very high temperatures employed in this portion of the kiln, complete combustion is ensured and the combustion products (e.g., primarily water, carbon dioxide and oxides of metal found in the container) are non-hazardous. Moreover, because suitable hazardous wastes for this process are readily available with little or no costs (indeed it is contemplated that there could be negative costs for these fuel elements), the use of such waste results in large fuel cost savings.

However, the charging of uncontainerized volatile fuel components into the feed end of a long wet or dry rotary kiln along with the to-be-processed mineral materials or into the pre-heat zone is expected to result in unacceptable emissions of hydrocarbons due to the release of the volatile components of the fuel in a region of the kiln where the temperatures are too low for ignition and to result in poor energy recovery due to the ignition of the remaining fuel prior to reaching the calcining zone where the energy can be utilized.

On the other hand, cement kilns, equipped with air suspension preheaters, lepol grate preheaters, and the like, have added high volatile fuel components to the feed end of such preheater kilns. The high volatile fuel components rapidly burn in the early part of the calcining zone and generate heat which is primarily transferred to the gas exiting the kiln. This heated gas enters the gas inlet of the air suspension preheater, lepol grate preheater, and the like as a cheap and efficient means to obtained preheated inlet gas for rapid heating and calcining of feed materials suspended in the gases. See, for instance, Naredi, Refra Symposium '82, pages 21–42 as well as Ogawa, U.S. Pat. No. 4,295,825. This practice is usually limited to about 10% of the total process fuel energy since the capacity of the process to utilize fuel burned at this point is limited because additional energy input beyond this results in increasing the process exit gas temperature and problems with hydrocarbon emissions are encountered. In view of the above, it is apparent that these prior art methods using preheaters are for the purpose of providing the heat necessary to heat the gas for use in the preheater device and accordingly, has significantly different thermodynamic considerations as compared to heating solid feed materials in the calcining zone of the rotary kiln portion of the process.

In still another prior art method, high volatile solid fuels have been used in suspension precalciners as a cheap source of fuel to effect calcination. In particular, precalciners have employed whole tires and tires cut into pieces sufficiently small to be dispersed so as to permit their use as fuel in precalciners. When so used, any portion of the fuel not burned in the precalciner chamber will fall into the feed end of the kiln where the remainder of the fuel is combusted which in turn heats the gas exiting the kiln. When the tire is cut into small pieces, the small size of the tire pieces and the high air temperature employed in the process result in sufficiently complete oxidation so that the exiting gas meets current EPA guidelines as to hydrocarbon emissions.

The use of volatile, waste derived, or other low quality fuels that could be obtained at minimal or no cost that are by their nature not suitable to be prepared in a manner that would allow them to be burned dispersed in a flame or, due to their low heating value, have an adverse effect on flame temperature, would impart a substantial fuel cost savings if they could be substituted for the primary fossil fuels conventionally employed in long wet or dry rotary kilns. Moreover, if these fuels could be used to generate heat directly in the calcining zone, the energy content of these fuels could be more efficiently used and a substantial portion of the process energy could be supplied by these low cost fuels. Additionally, in view of the fact that the majority of the heat required to manufacture cement clinker via a conventional long wet or dry rotary kiln occurs in the calcining zone, the use of high volatile fuels in the calcining zone would be particularly advantageous.

However, in spite of the economic benefits, use of such fuels in the calcining zone of a conventional long wet or dry kiln without first containerizing these fuels so as to render them non-volatile was thought to be impractical for several reasons. Firstly, all of the fuel added to the calcining zone must be substantially burned (particularly residual carbon) before it enters the clinkering zone. In particular, large amounts of carbon entering the clinkering zone create reducing conditions which change and degrade the quality of clinker in terms of strength, color, etc. Secondly, if the volatile fuel added to the calcining zone volatilizes and burns too quickly, then the fuel will overwhelm the available oxygen in the kiln and result in unacceptable emissions of hydrocarbons, carbon monoxide and the like in the gases exiting the kiln. Additionally, it was heretofore believed that it was not possible to add high volatile, low ignition temperature fuel directly into an area of the calcining zone of a conventional long wet or dry rotary kiln where the energy could be most efficiently used because of the high temperatures (significantly greater than 2000° F.). Further, recently proposed emission standards for waste combustion, including municipal and hazardous wastes, are so strict (as compared to those for fossil fuel combustion) that it was believed that any such use of waste fuels in a long kiln by other than dispersion in the flame in the sintering zone would result in non-compliant emissions.

In view of the above, it is one object of this invention to provide a process for the manufacture of cement clinker in a conventional long wet or dry rotary kiln characterized, inter alia, by the combustion of volatile fuel elements directly in the calcining zone of the kiln without first containerizing the fuel elements.

It is a further object of this invention to provide a process for the manufacture of cement clinker in a conventional long wet or dry rotary kiln characterized by reduced fuel costs per unit of product.

It is still a further object of this invention to provide a process for the manufacture of cement clinker in a conventional long wet or dry rotary kiln which permits the utilization of high volatile, solid fuels including low grade fuels in an environmentally sound manner.

It is still a further object of this invention to provide a process for the manufacture of cement clinker in a conventional long wet or dry rotary kiln characterized by reduced NOx emissions.

It is yet a further object of this invention to provide a process for the manufacture of cement clinker in a rotary kiln characterized by a reduced consumption of premium conventional fuels.

It is yet further object of this invention to provide a process for the manufacture of cement clinker in a conventional long wet or dry rotary kiln characterized by improved operating stability in the kiln.

It is yet another object of this invention to provide a process for the manufacture of cement clinker in a conventional long wet or dry rotary kiln characterized by improved manufacturing efficiency as related to the thermodynamic needs of the chemical process and the operational and mechanical needs of the process equipment.

SUMMARY OF THE INVENTION

The present invention is directed to the combustion of solid, high volatile fuels in the calcining zone of a conventional long wet or dry cement rotary kiln in an environmentally sound manner and specifically relates to the discovery that if such fuel is appropriately dimensioned prior to addition into the kiln, then high quality clinker is produced in an environmentally sound manner.

Accordingly, in one of its process aspects, the present invention is directed to an improvement in the process for the manufacture of cement clinker in a conventional long wet or dry inclined rotary kiln comprising a calcining zone and a clinkering zone wherein cement raw materials comprising calcareous material, silica-containing material, alumina-containing material and iron containing material are passed through said inclined rotary kiln and heated at calcination and clinkering temperatures by the combustion of fuel in the gaseous atmosphere within said kiln, said improvement comprising the steps of (1) processing solid, high volatile fuel having a volatile content of more than about 40% into fuel elements, without containerization of the fuel, wherein said fuel elements are sufficiently large so as to retard and extend pyrolysis and combustion throughout the calcining zone and sufficiently small so as to result in substantially complete combustion before entering the clinkering zone; and (2) charging said fuel elements to the calcining zone of the kiln to provide from about 5 to about 75% of the fuel heat required for the cement manufacturing process.

DETAILED DESCRIPTION OF THE INVENTION

Figure 1:
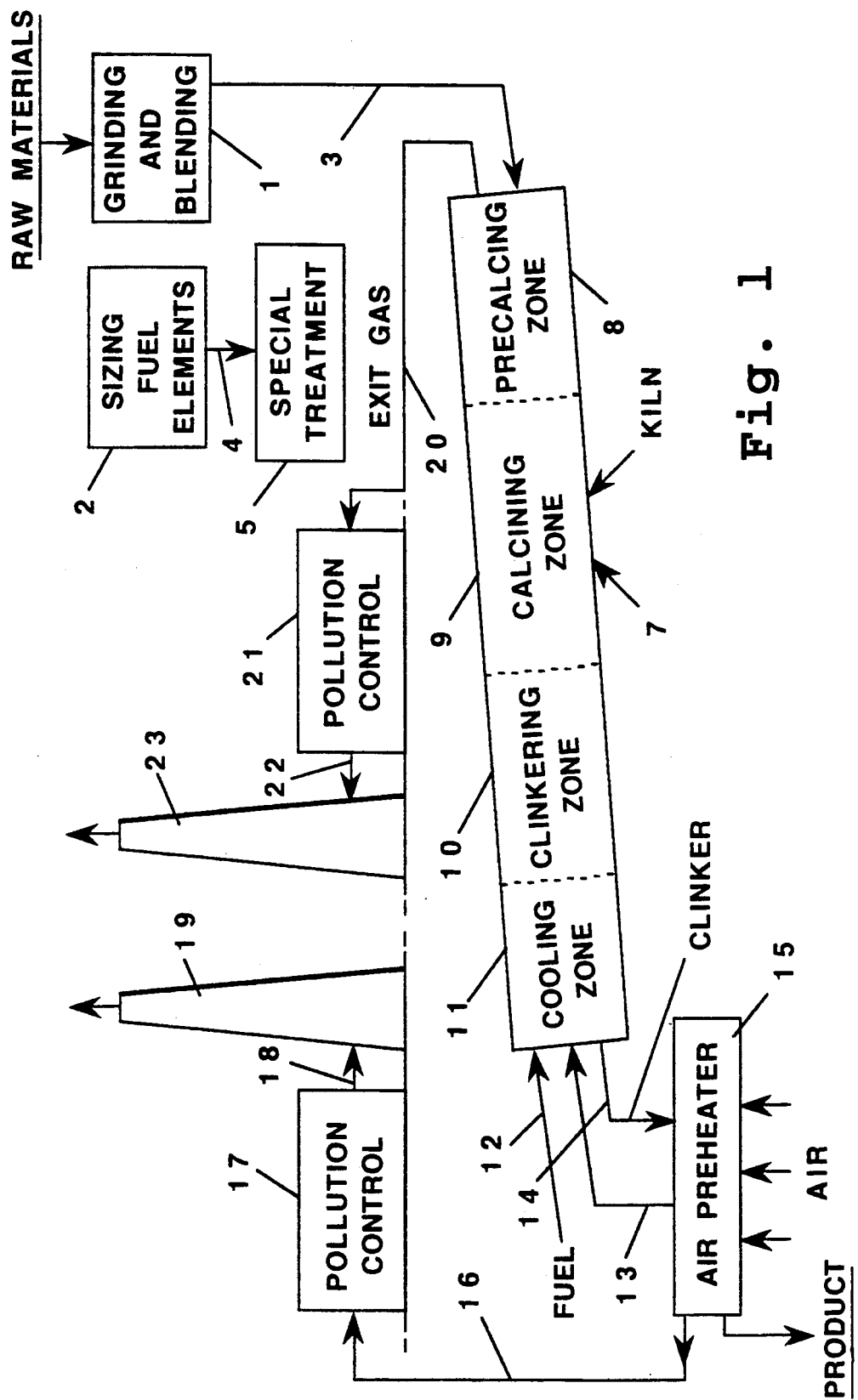
FIG. 1 is a schematic flow sheet of a cement manufacturing process which can be employed in the process of the present invention.

This invention relates to a method for achieving environmentally sound use of high volatile fuels and especially high volatile, low ignition temperature fuels in the calcining zone of a rotary kiln without the need to containerize such fuel prior to addition to said kiln.

The rotary kilns for use in this invention include the conventional long wet or dry type rotary kilns as well as rotary kilns equipped with pre-heaters. Common to each, however, is a heated, rotating cylinder containing in-process material being converted to cement clinker.

It has been recognized that high volatile fuels can be used as a source of cheap fuel for the manufacture of cement clinker. Applicants have determined, however, that there are material advantages to be obtained by the combustion of high volatile fuels in the calcining zone of a conventional long wet or dry rotary kiln and specifically add appropriately dimensioned high volatile, solid fuels in controlled amounts to achieve those advantages. For example, addition of such solid, high volatile fuels to provide 20% of the total fuel requirements of a conventional process may reduce the amount of conventionally added fuel by up to 25% or more because of increased thermal efficiency, thereby yielding up to a 5%; or more decrease in the total energy required per unit of product or achieving 125% effectiveness of the utilization of the energy in the high volatile solid fuel as compared to conventional firing. Additionally, because the cost of the high volatile fuel is expected to be substantially less than that of conventional fuels, additional savings can be realized.

This invention specifically overcomes the limitations on introducing high volatile fuel into the kiln as a result of the high temperature in the heart of the calcining zone (gas temperatures well over 2000° F.) by a) adding the high volatile fuel to the early part of the calcining zone (gas temperatures near 2000° F.) and b) dimensioning the high volatile fuel into fuel elements such that the combustion rate of the element is retarded sufficiently such that it is conveyed along with the in-process material to the heart of the calcining zone where the energy released is most efficiently utilized.

When so conducted, the process of this invention results in the combustion of the volatile fuel element directly in the calcining zone without the generation of unacceptable emissions (e.g., hydrocarbon and carbon monoxide emissions). Additionally, in a preferred embodiment, the fuel elements employed herein will be of uniform weight so that hydrocarbon emissions will be uniform thereby resulting in reduced likelihood of hydrocarbon emission spikes which exceed emission standards. However, fuel elements of non-uniform weight can be accommodated in the process of the present invention because the pyrolysis of the fuel element is extended and accordingly, periodic addition of fuel elements will result in multiple fuel elements burning simultaneously which would result in an averaging of the effect of each element.

High volatile, solid fuels for use in this invention are those fuels having a volatile content of greater than about 40 weight percent of the fuel wherein volatile is defined as the weight percentage of the fuel portion of the fuel element (excluding non-fuel components such as binders, nails, straps, etc.) which is volatilized at about 1000° F., calculated on a moisture and ash-free basis. See ASTM test no. ASTM-D3175-77. Preferably, these high volatile, solid fuels have an ignition temperature of about 300° F. or more for the volatile portion of the fuel and an ignition temperature of greater than about 750° F. or more for the non-volatile portion of the fuel, i.e., the portion of the fuel which does not volatilize at about 1000° F. Such preferred fuels are termed high volatile, low ignition temperature fuels. Suitable high volatile fuels for use in the processes herein described are characterized as follows:

| Parameter | Broad Range | Preferred Range | More Preferred Range | Most Preferred Range |
|---|---|---|---|---|
| Volatile Contents[a] | >40 | >40–80 | 50–70 | — |
| Volatile Ign. Temp. | — | 300° F. or more | 300–1000° F. | 500–1000° F. |
| Non-Volatile Ign. Temp. | — | 750° F. or more | 1000–1500° F. | 1200–1500° F. |

[a]reported in weight percent.

The high volatile fuels employed in the practice of this invention provide from about 5 to about 75%, desirably from greater than about 10 to about 75%, preferably from greater than about 10 to about 60%, and more preferably from about 20 to about 50% of the total heat required for the entire clinkering process. The ash content of the high volatile fuels elements (which can include non-fuel components) employed in the practice of this invention is not critical and the fuel can have any ash or non-fuel component content which can be tolerated by the cement and the manufacturing process. In general, fuels having ash contents of less than about 40% will usually be tolerated by the cement and the manufacturing process.

Representative high volatile, solid fuels which can be used in preparing fuel elements for use in the herein described processes include waste materials such as rubber tires, combustible municipal wastes which have preferably been pre-sorted to remove non-combustible components (although the inclusion of some inorganic non-combustible materials in the fuel can usually be tolerated by the herein described process), forest products, agricultural wastes, industrial and hazardous wastes, medical wastes, treated wood, railroad ties and the like so long as the above criteria regarding volatile content are met. It will be understood that a mixture of fuels may be employed as a high volatile fuel and that the characteristics of such a fuel may be tailored by adding volatile or non-volatile ingredients to it. Adjustments in the chemical composition of the cement making feed material may be desirable to compensate for the incorporation into the clinker of substances, such as iron and silica from the ash of the high volatile fuel.

A critical criteria required in the herein described process is that the fuel elements be appropriately dimensioned prior to addition to the calcining zone of the kiln. The dimensions of the fuel elements depend primarily on the combustion/pyrolysis characteristics of the fuel. The appropriate dimensions are selected with the following considerations:

a) the surface area to volume ratio of the fuel element is sufficiently small (small ratios result from large elements) so that upon addition of the element into the calcining zone, the element will not immediately pyrolyze and/or combust (e.g., pyrolysis and combustion are retarded) but will rather fall into or onto the bed of cement raw materials and its combustion and pyrolysis will be extended further into the calcining zone so as to provide an efficient source of heat for calcining the calcium carbonate to calcium oxide. As noted above, if the fuel element combusts and/or pyrolyzes too rapidly, the heat generated is inefficiently employed by primarily heating the gases circulating in the kiln which can additionally cause unacceptable emissions and can result in inefficient use of the fuel; and b) the surface area to volume ratio of the element is sufficiently large so that substantially complete combustion of the element will occur in the calcining zone and accordingly, little if any uncombusted material enters the clinkering zone of the kiln. As noted above, if substantial amounts of uncombusted fuel enters the clinkering zone, this uncombusted fuel generates reducing conditions in the cement raw materials which has serious negative results on the quality and appearance of the so produced cement clinker.

The present invention is directed, in part, to the discovery that the above two criteria are not mutually incompatible and accordingly, it is possible to dimension high volatile fuel in a manner which meets both objectives, e.g., by dimensioning individual components of fuel into an appropriately dimensioned fuel element.

In particular, the above objectives are met if fuel elements are employed which are from about 2–100 lbs and preferably from about 25–75 lbs and are dimensioned to have a surface area to volume ratio of from about 50 $ft^{-1}$ to about 2 $ft^{-1}$; and more preferably a surface area to volume ratio from about 10 $ft^{-1}$ to about 4.5 $ft^{-1}$. When such fuel elements are employed, initial pyrolysis/combustion is reduced which, in turn, minimizes hydrocarbon and carbon monoxide emissions. In order to achieve the above parameters, it may be necessary to configure the solid, high volatile fuel into fuel elements. In a preferred embodiment, the surface area of the fuel elements is maintained to as low a level as possible (e.g., a more smooth surface has a smaller surface area as compared to a less smooth surface) to reduce initial pyrolysis/combustion so as to minimize hydrocarbon and carbon monoxide emissions. Without being limited to any theory, the minimal surface area further reduces initial pyrolysis because the surface area available to transfer heat is minimized with respect to the mass (volume) of the fuel element.

Preferably, an ideal fuel element would be a cylinder of compacted light waste fractions or plastic having dimensions of about 1 ft in diameter by 2 ft in length. Materials like rubber might be dimensioned smaller, as low as 0.166 ft in diameter by 0.166 ft in length. Whole used tires would generally have a larger surface area to volume ratio than 50 $ft^{-1}$ and accordingly, such tires will need to be dimensioned prior to use in the methods of this invention.

As used herein the term "surface area to volume ratio" refers to the ratio of the surface area of the solid fuel element to its volume. This ratio will inherently be expressed as an inverse of a unit of measurement such as $feet^{-1}$, $inches^{-1}$, $meters^{-1}$, etc. For the sake of illustration, the fuel element will be described as a sphere. In such a situation, the volume of a sphere is defined as $4\pi r^3/3$ whereas the surface area of a sphere is defined as $4\pi r^2$. Accordingly, the surface area to volume ratio refers to the fraction whose numerator is $4\pi r^2$ and whose denominator is $4/3\pi r^3$. In the case of a sphere, such a fraction can be reduced to simply $3/r$. Thus, if the fuel element is a sphere having a radius of 0.5 feet, then the surface area to volume ratio of this sphere is 6 $feet^{-1}$. In the case where the fuel element is a cube, the volume of the cube is defined as the length $\times$ width $\times$ height (or because, by definition length=width=height in a cube, $length^3$) whereas the surface area is defined as $6 \times length^2$. Therefore, in a cube, the surface area to volume ratio becomes 6/length. Thus, if the length of the cube was 1 foot, the surface area to volume ratio of the cube would be 6 $feet^{-1}$. Particularly preferred elements for use in the herein described processes are generally cubical, spherical or cylindrical having the surface area to volume ratios described above. Cubically or cylindrically shaped fuel elements having the requisite dimensions for use in this invention include 2 inch cubes which have a surface area to volume ratio of 36 $ft^{-1}$, cylinders having a 1 foot diameter and a height of 2 feet which results in a surface area to volume ratio of 5 $ft^{-1}$, and the like.

In another embodiment, it is contemplated that large fuel elements having a surface area to volume ratio less than that cited above can be used herein provided that the fuel elements quickly break apart in situ into separate elements having the requisite dimensions cited above.

The surface area to volume ratios recited above (in $feet^{-1}$) for use in the herein described processes define a range of suitably dimensioned fuel elements which will provide both retarded pyrolysis and combustion upon addition to the calcining zone but also will permit substantially complete combustion of the element prior to entering into the clinkering zone. The specific surface area to volume ratio employed will, of course, depend on the solid, high volatile fuel employed, the point in the calcining zone where this fuel is added, the rate of throughput, the non-fuel component used to produce the fuel element, etc. Such factors can readily be ascertained by the skilled artisan with reference to this disclosure.

Without being limited to any theory, it is believed that several factors account for the ability to add such fuel elements to the calcining zone of the kiln. Initially, the fuel element is added to the calcining zone at a point near the feedend of the calcining zone where the oxygen content of the gases circulating through the kiln is depleted, typically 3-5 volume percent oxygen, which further reduces initial pyrolysis and consequent rapid combustion of the fuel element.

It is further believed that upon addition, the large fuel element falls into and floats or is partly or at times wholly immersed in the relatively cool cement raw material (i.e., generally having a temperature of 1200°-1500° F.) compared to the temperature of the gases circulating at this point of the kiln (i.e., generally having a temperature of 1700°-2000° F.). Contact with the cement raw material immediately reduces the initial surface temperatures of the fuel element acquired when passing through the hot gases and further reduces available oxygen thereby further reducing initial combustibility.

It is further believed that pyrolysis of the fuel element into combustible gases will occur rapidly on the surface of the element and initiate rapid combustion of these gases as the element progresses with the kiln material into an area of the kiln gases having progressively increasing oxygen content.

Lastly, it is still further believed that the char from the disintegrating element will burn relatively slowly in and/or on the material bed of the kiln having progressively higher oxygen content. Alternatively, the fuel elements may retain their integrity as a porous lump of char through the entire process with final pyrolysis and combustion occurring well within the clinkering zone. In this eventuality, it is believed that the reducing conditions will be very limited to the materials adjacent to the char lump and that these reducing conditions would be sufficiently limited to allow re-oxidation of reduced clinker compounds in the relatively oxygen rich clinker burning zone.

In order to enhance the compatibility of the fuel elements for use in this process, the fuel elements may, if desired, be coated with ignition retardants in order to facilitate delayed ignition of these elements, or be treated with wetting agents, dispersants, anti-foaming agents, additives to control surface tension, additives to decrease clinkering temperature, oxidizing catalysts, subjected to surface electrostatic modification, or the like.

The above discussion was with regard to fuel elements in general and the following will be with regard to two specific fuel elements as further exemplification:

Combustible municipal refuse elements can be used herein but preferably these should first be sorted to remove non-combustibles. However, as noted above, for cement industry application, some portion of the non-combustible inorganic materials (glass, iron, dirt, etc.) can be tolerated since most inorganics that dominate municipal refuse are acceptable raw materials for the cement making process. The combustible municipal refuse is then dimensioned by compaction or sorting into appropriately dimensioned solid, high volatile fuel elements for ultimate use as a fuel element in the process of this invention.

In addition to municipal refuse, many other waste solids, such as agricultural and forestry wastes, processed rubber tires, hazardous and medical wastes, and other wastes, can be processed into fuel elements.

As noted above, such fuel elements (including rubber tires discussed below) can be coated with an ignition retardant to prevent or retard ignition when the fuel element enters the kiln exhaust gas stream. One suitable retardant could be a slurry produced from raw materials, waste dust or similar readily available materials at a cement plant. This procedure may be particularly applicable to very high volatile fuels.

Optionally, the fuel elements may be wrapped, coated or otherwise encapsulated during transport and storage so that the fuel element components are not exposed to the atmosphere or to human contact. In particular, such encapsulation can include coatings (latex, polyvinyl chloride, urethane, high density polyethylene, etc.) or wraps such as shrink wraps, synthetic wraps, paper, etc.

When compacted fuel elements are employed, these elements may require axial and/or peripheral ventholes which can be placed during the compaction process. Such ventholes would relieve combustible gases and thereby prevent disintegration or even explosion of the fuel element into small pieces due to rapid heating and pyrolysis. Such ventholes may also be required to allow relief of vapors generated by the heating that may occur during compressing moist materials into large elements. This possibility might apply to particularly high volatile fuels and/or materials which form a tight and cohesive fuel element. Other materials such as wood chips, shredded rubber tires and similar large particles may require binding additives and/or heat or chemical treatment to provide sufficient cohesiveness to form suitable fuel elements. For example, sewage sludge might serve as a suitable binding agent for municipal refuse elements. Similarly lignin tars, pitch, etc. might be used as a binder for forestry products. Waste vegetable oils might facilitate binding of agricultural products.

Fuels which are liquids, viscous, sludges or semisolids in their original form, can be mixed with dry powders or materials so as to permit formation of a suitably solid fuel element for use in this invention. Such dry powders can include feed material for the kiln which would serve as a suitable and preferred additive to generate a solid fuel element. Other suitable powders or materials include limestone, kiln dust, argillaceous minerals, iron oxides, agricultural wastes (straw, hull, etc.), forestry wastes (sawdusts, shavings, etc.) and the like.

Rubber tire fuel elements can also be employed herein. It is contemplated that the combustion of whole rubber tires can be conducted in the calcining zone of a rotary kiln provided that the tires are dimensioned as set forth above. In this regard, it may be necessary to compress whole tires between opposite tread faces to form elements nominally 6×12 inches in cross section and in a length equal to half of the outside (tread) circumference of the tire. Compression can be achieved by, for example, cutting the inner beads and sidewalls of each tire to prevent restraints in compressing the tire to one-half the length of the outer tread circumference. Alternatively, the tire can be debeaded by using a debeader machine commonly available in the waste tire industry. The tire so compressed while lying flat on a table could be retained in the compressed shape by using wire ties, steel bands, staples, bent nails, etc.

Alternatively, tires could be compressed by pulling the tire through a funnel by using a hook attached to the tire inner beads attached to a winch-driven cable. The funnel would be shaped to allow entry of a full-sized tire and then tapered to a variable sized outlet to obtain desired size reduction of various diameter tires. The tire would be wire-tied, banded, stapled, nailed, etc. as it emerges from the funnel in the fully-compressed shape.

When so compressed, it may be desirable to use anti-friction plastics and/or soapy water to reduce friction in the funnel. Alternately, the funnel compression surfaces might be constructed of rollers to reduce pulling friction.

Tests performed show that tires are rather easily compressed after the inner beads are cut or removed and tire sidewalls are cut. Also determined was the ease that ordinary carpenter nails can be hammered and bent to retain the tire in a compressed shape. This suggests a method to automate the tire collection process and increase tire density by about fourfold to reduce transportation, storage and disposal costs by a similar factor of four. The concept may be summarized as follows:

a. Tire collection trucks would include a powered lifttail gate equipped with the compression mechanism (vice/clamps or funnel).
b. The retrieved tires would be placed in position for bead and sidewall cutting/compression function followed by automatic banding, tying, nailing, etc. The compressed and restrained tire would be ejected into a conveyor for loading into the truck. The ejection procedure would allow reloading of the compression mechanism.
c. The so compressed and restrained tires would then be stacked in the truck for transport to a use point (cement plant) re-transfer to railroad cars for shipment to use or dump points, or directly to disposal (landfill) sites.

Furthermore, the variable weight of rubber tires might be made relatively uniform by using smaller tire carcasses as containers for shredded tire pieces. For example, if approximately 60 lb. tire fuel elements becomes the standard size desired at a particular plant, then all 50-70 lb. tires could be compacted as above. The carcass of 20 lb. tires could be filled with 40 lbs. of shredded rubber and then compressed into a compact fuel element as above. Similarly, a 40 lb. tire would be filled with 20 lbs. of shredded rubber. All tires exceeding 70 lbs. and other waste rubber materials including any excess quantities of lighter and smaller rubber tires would be used as the source of shredded rubber. This approach would be most suitable at central tire and waste rubber processing centers.

On the other hand, large objects such as tree trunks, railroad ties, telephone poles and the like may need to be reduced in size in order to provide a fuel element having suitable surface area to volume ratios for use in this invention.

The skilled artisan, with reference to the above discussion, could readily select other volatile fuel elements which, if necessary, could be appropriately dimensioned into fuel elements for use herein.

The so compacted and dimensioned high volatile fuel element is then added to the calcining zone of a long wet or dry rotary kiln via a drop tube, scoop or the like, placed on the surface of the kiln. Suitable drop tubes are disclosed in U.S. Pat. Nos. 4,850,290 and 3,357,689 as well as U.S. Ser. No. 07/275,788, filed Nov. 23, 1988, the disclosures of which are incorporated herein in their entirety by reference. As noted in U.S. Pat. No. 4,850,290, the positioning of the drop tube on the kiln is governed by temperature of the gases circulating at that point in the kiln. That is to say that the drop tube cannot be placed in that portion of the calcining zone having gas temperatures greater than about 2500° F. because such temperatures would damage the tube. Accordingly, in a preferred embodiment, the drop tube is generally placed toward the feed end of the calcining zone, i.e., the upper portion of the calcining zone, where the temperatures of the gases circulating through the kiln are generally around 2000° F.

As noted above, the use of solid, high volatile fuel having the requisite surface area to volume ratio significantly retards the rapid pyrolysis and/or combustion of the fuel resulting in the bulk of the fuel being added to the cement raw materials and moving with these materials toward the heart of the calcining zone. As also noted above, rapid combustion and/or pyrolysis of the fuel is undesired because it primarily results in heating the gases circulating through the kiln rather than in the more thermally efficient heating of the cement raw materials and further because rapid volatilization of the fuel can overwhelm the oxygen in the gases circulating through the kiln resulting in substantially increased emissions of hydrocarbons and carbon monoxide in the gases exiting the kiln. On the other hand, as a result of employing the appropriately dimensioned solid, high volatile fuel elements described above, the fuel does not rapidly combust and/or pyrolize but rather falls into the interior and/or onto the surface of the bed itself and in contact with the cement raw materials, which upon combustion, the heat from the fuel is transferred to the cement raw materials by conduction, convection and radiation. These as well as possible other factors result in improved thermal efficiency, and consumption of conventional fuels is reduced by an amount greater than the fuel heating value added as high volatile fuel. Accordingly, the practice of this invention not only increases thermal efficiency but at the same time reduces the consumption of premium conventional fuels and permits the use of substantial amounts of inexpensive high volatile, low ignition temperature fuels while still meeting emission standards.

Again without being limited to any theory, it is believed that because of the increased excess air in the burning zone, the main burning zone temperatures in the kiln and the kiln shell temperatures will be lower than conventional kiln operating temperatures when operated with the same throughput, especially in kilns with high thermal loading. Additionally, the reduced fuel consumption of the main burner will lead to less NOx being produced and emitted with the gases exiting the kiln.

It is known in the art to add calcium sulfate to cement during final processing so as to improve the setting properties of the ultimate cement product. On the other hand, in conventional firing of cement kilns, sulfur in the fuels and raw materials can be carried off in the kiln exhaust gases thereby adding to environmental pollution. In the process of this invention, there is an increase in the oxygen level in the sintering zone which suppresses the volitization of sulfur resulting in a higher sulfur level in the produced cement clinker. Accordingly, the process of this invention not only results in lower emissions of sulfur oxides; but because of the increased sulfur retention in the cement clinker, it also reduces the need for subsequent addition of calcium sulfate to the cement produced.

In addition to the more efficient utilization of energy, the process yields a further important advantage in that it may increase the operating life of the kiln lining and internal parts thereby enabling kilns to be used for longer periods before they must be shut down for relining thereby producing savings in the cost of cement clinker production. This is mainly a result of the increased oxygen in the sintering zone and the resulting change in thermal and oxidizing conditions which not only result in more efficient utilization of energy but also in improvements in the quality of the resulting product.

Another advantage of the process of the invention appears in rotary cement kilns equipped with suspension preheater systems wherein cement making feed materials and the kiln exhaust gases are passed through a series of cyclones in order to recover useful heat from the exhaust gases before the cement making materials enter the kiln proper. In conventional operation of such systems, volatile salts are vaporized in the kiln and pass with the exhaust gases into the preheater cyclones where they condense and form deposits which may plug up the preheater system. These deposits in the preheater system in turn necessitate periodic cleaning and frequently require shutdown of the kilns, as often as weekly in some plants, while the accumulated deposits are removed. The energy wasted in allowing the kiln to cool and then bringing it back up to operating temperatures and the concomitant adverse effect on the economies of cement production are apparent. However, in the process of the invention, the lower operating temperatures and/or increased oxygen in the sintering zone reduces the volatility of the salts and sulfur thereby reducing the amount of salts passing into the cyclones and reducing or eliminating the deposits in the preheater system.

Improved thermal efficiency not only reduces the fuel cost per unit of product and results in a reduction in wear on kiln internals such as brick, per unit of product, but since the total fuel consumption is decreased per unit of product, the volume and velocity of the exit gases per unit of product are decreased correspondingly and the size of air pollution control equipment may be less for a plant of given productive capacity.

Further, the dimensions, e.g., the surface area to volume ratio, of the solid, high volatile fuel, are such that the fuel elements will sufficiently combust prior to entering the clinkering zone, and accordingly, there is substantially minimal, if any, effect on the quality of the cement clinker produced by the processes herein described and, in fact, may be beneficial due to the increased oxygen in the sintering zone and a temperature profile more favorable to producing a quality clinker.

The practice of this invention permits the production capacity of existing cement rotary kiln installations to be increased and permits the use of smaller size new equipment for a given production capacity.

Raw materials for the manufacture of cement are well known and will not be described in detail here. Generally, however, a calcareous material is employed in conjunction with material that provide $SiO_2$ and $Al_2O_3$. Most often, materials that provide $Fe_2O_3$ also are employed. It will be understood that one additive may supply more than one of the raw material ingredients. For example, a clay may supply both $SiO_2$ and $Al_2O_3$.

Typical cement raw material mixes may contain from about 70% to 80% $CaCO_3$, from about 12 to about 20% $SiO_2$, from about 3 to about 7% $Al_2O_3$, and from about 2 to about 5% $Fe_2O_3$. The raw material mix can, of course, contain other minerals as well and, indeed, many mixes will contain up to about 4% MgO. While the above ingredients and proportions are typical, mixes can vary in proportions and/or ingredients. The raw materials generally are finely powdered and are blended either in the dry state or in aqueous slurries to provide a homogeneous mix. If desired, the raw materials may be pelletized and fed to the kiln.

The invention may be more readily understood by reference to FIG. 1 which is a schematic flow sheet of a cement manufacturing process which can be used in this invention. The invention will first be described with respect to a dry process and thereafter be described with regard to a wet process.

Cement raw materials such as limestone, clay and sand, or the like, are finely ground and intimately mixed to provide a substantially homogeneous mixture at grinding and blending station 1 and is passed into kiln 7 via line 3. Kiln 7 has four operating zones, a precalcining zone 8, a calcining zone 9, a clinkering zone 10 and a cooling zone 11. Conventional fuel is fed to the kiln through line 12 and is combined with preheated air which is introduced into the kiln through line 13. Fuels such as natural gas, oil or powdered coal are conventionally employed in cement manufacturing processes.

As the finely divided cement raw materials pass into the rotating kiln, they are heated from near ambient temperature to about 1000° F. in the pre-calcining zone 8. In this zone the heat of the hot combustion gases from the calcining zone is used to raise the temperature of the raw materials. Additionally, in the kiln, chain systems or the like are frequently employed to improve the efficiency of heat exchange between the gases and raw materials. Since high volatile fuels may contain trace elements including vanadium, special precautions may be required to reduce any deleterious effect of trace elements on the chain systems if such systems are employed, on the refractory, or on the environmental quality of waste gases.

The temperature of raw materials is increased from about 1000° to about 2000° F. as they pass through the calcining zone 9, and in this zone $CaCO_3$ is decomposed with the evolution of $CO_2$. It is in this zone that the solid, high volatile fuel elements are added to kiln 7 via a portal, not shown, as described in U.S. Pat. No. 4,850,290, so as to provide a portion of the heat required for this phase of the process.

Solid, high volatile fuel is appropriately dimensioned and, if necessary, compacted into suitable sized fuel elements prior to use in kiln 7 at, for example, station 2. If desired, the fuel elements are passed by line 4 to treatment station 5 where the elements may be treated with ignition retardant, and the like. Since the fuel elements are intimately mixed with the cement raw materials, the heat transfer from combustion of the fuel is quite efficient. The increased heat transfer rate may reduce the length of calcining zone 9. This phase of the process, therefore, becomes less dependent on the heat transfer from hot gases generated in line 12, allowing the temperature of these gases to be lower, and thus refractory brick life will increase throughout the kiln. If calcining zone 9 is shortened, precalcining zone 8 may be lengthened so that more sensible heat may be recovered from the combustion gases thereby further increasing the thermal efficiency of the process. Reducing calcining zone 9 fuel requirements will permit the selection of smaller equipment for new facilities, will permit an increase in production rates of existing facilities and may reduce gas velocities and dust entrainment for either existing or new facilities. Reduction in the amount of exhaust gases may also allow the use of smaller diameter kilns.

Sufficient air can be introduced into the kiln through line 13 to provide for the combustion of the conventional fuel as well as combustion of the fuel elements or, alternatively, supplemental oxidizing agent, such as air, preferably preheated, can be introduced directly into the calcining zone 9. It is important that sufficient oxygen be supplied to the kiln to maintain oxidizing conditions, although reducing conditions may exist in some localized portions of the bed. Thus it is preferred to maintain an uncombined oxygen level in the kiln exhaust gases of from about 0.5 to about 5.0 percent; desirably from about 0.5 to about 2.0 percent. Failure to maintain adequate oxygen levels may result in detrimental loss of unburned fuel values in the form of carbon monoxide in the kiln exhaust gases and in the form of unoxidized carbon, sulfur or iron in the clinker. Inadequate oxygen levels in the system may also lead to the production of inferior clinker due to the presence of metallic iron, elemental sulfur or undesirable sulfur compounds in the cement product. The kiln can be equipped, if desired, with means to ensure that the fuel elements in calcining zone 9 will be oxidized at the surface of the bed, or air or oxygen can be introduced into the bed. Since less fuel is consumed per unit of product in the process of this invention, the amount of air required will also be less than that required for conventional processes.

Calcined material at the temperature of about 2000° F. then passes into clinkering or burning zone 10 wherein the temperature is raised to about 2300°-2900° F. It is in this zone that the primary raw materials are converted into the typical cement compounds: tricalcium silicate, dicalcium silicate, tricalcium aluminate, and tetracalcium-aluminoferrite.

The cement clinker leaving the clinkering zone passes into cooling zone 11 wherein it is cooled to about 2200° F. with the heat being used to further preheat combustion air from line 13. The clinker thereafter passes through line 14 to clinker cooler 15 wherein the sensible heat of the clinker is employed to preheat combustion air. The clinker cooler 15 may be a separate stationary piece of equipment or it may be mounted on the kiln and rotated with it. The clinker itself may be cooled in clinker cooler 15 to near ambient temperature, such as, for example, about 150° F. and thereafter may be processed further such as by grinding and the like. Excess air, if any, from clinker cooler 15 is passed through line 16 and processed at 17 for the removal of pollutants. The cleaned air may be passed through line 18 and exhausted through stack 19.

Exit gases from the kiln are passed through line 20 to pollution control processing station 21 wherein dust, and the like, is removed. The cleaned gas is passed through line 22 and exhausted through stack 23. Pollution control equipment for the exit gases may be smaller than in a conventional process because the exit gases are less. The pollution control equipment for air from clinker cooler 15, however, may be somewhat larger than in a conventional process because less air will be sent to the process and more will be exhausted through stack 19.

Instead of adding the raw materials to the kiln as finely divided particles as described above, the raw materials may be agglomerated by the presence of moisture and added to the kiln, such as is done for example in the Lepol process. Moreover, this invention may also be employed in conjunction with a wet process. Dry processes as well as the wet process are well known to those skilled in the art.

In the wet process, the raw materials are added to water and mixed to form a slurry which, as fed to the kiln, generally has a solids content of from about 55 to about 70%. In the wet process the first zone of the inclined rotary kiln is a drying zone wherein the feed is heated to remove water and results in the raw material being heated to about 200° F. The heat required to dry the slurry is from the heat remaining in the hot gases coming from the precalcining zone. The remaining successive zones of the kiln, that is the precalcining zone, the calcining zone, the clinkering zone and the cooling zone, function as described above.

The shortening of the calcining zone, as described above, results in lengthening of the other zones of the kiln. Lengthening of the clinkering zone has the advantage of increasing the capacity of the kiln. Also, in a wet process kiln, lengthening of the drying zone may increase drying capacity.

The following examples are included for illustrative purposes only and in no way are intended to limit the scope of the invention.

EXAMPLE 1

A wet process cement rotary kiln 12 feet in diameter by 450 feet long with a capacity of 34 tons per hour of clinker is modified by adding an apparatus for feeding solid materials into a rotary kiln such as described by Arnesen, et al, U.S. Pat. No. 3,357,689 or by an apparatus for charging solid fuel to rotary kilns such as described by Peterson et al., U.S. patent application Ser. No. 07/275,788. The selection of the apparatus is dependent on the specific handling characteristics of the fuel elements to be used. The apparatus is installed at about the 225 foot location on the 450 foot rotary kiln.

Fuel elements prepared from processed municipal solid waste (preparation typically involves shredding, ferrous metal removal, air classification, and compaction into cylinderical fuel elements measuring 12 inches in diameter and 24 inches long, having a surface area to volume ratio of approximately 5 $ft^{-1}$ and weighing approximately 50 pounds) are received with the typical analysis:

| | |
|---|---|
| Volatile Matter | 69.4% |
| Moisture | 10.5% |
| Fixed Carbon | 12.4% |
| Ash | 7.6% |
| Heating Value | 7692 Btu/lb |
| Total Sulfur | 0.2% |

The fuel elements containing 384,600 Btu per element are charged to the calcining zone of the kiln through the apparatus described above at the rate of two fuel elements per revolution of the kiln. This supplies 53.8 million Btu per hour at 70 revolutions per hour. The primary fuel being fired to the kiln at the rate of 180 million Btu per hour is reduced to maintain the oxygen level of the exit gases between about 1.5 to 2.0 percent by volume oxygen. The resulting increase in oxygen and reduction of fuel in the sintering zone results in the primary flame intensifying and becoming more compact. A burner, such as described by Hansen, U.S. Pat. No. 4,732,093 (which is incorporated herein by reference in its entirety), that is designed to minimize the dispersion of fuel particles into the secondary air will produce a high temperature flame in the presence of high excess air, would be required. The reduced thermal loading in the sintering zone results in thicker coating and improved insulation thereby reducing heat losses. As the process reaches equilibrium additional fuel and draft (i.e., the mass flow of gases through the kiln) is reduced to prevent overheating of the kiln and to maintain the oxygen level.

Other preferred fuel elements include processed and separated plastic such as plastic soda bottles and the like, compacted into 12-inch diameter by 18-inches long fuel elements weighing 50 to 80 pounds each and rubber tires, processed and bundled into bales weighing 50 to 100 pounds each and dimensioned about 12-inches in diameter and 36-inches long. Other fuels, such as high volatile, low quality, lignite coals can be dimensioned to be retained on a 1-inch sieve and pass a 4-inch sieve and added through an apparatus disclosed in U.S. Pat. No. 3,357,689. To obtain the operating benefits of this invention operators may elect to use conventional, premium, or high volatile fuels in the manner described.

The invention is best practiced by using kiln gas monitoring instrumentation that monitors $O_2$, CO, NOx, and THC to assure the fuel in completely burned and the process remains environmentally sound.

Since modifications of this invention will be apparent to those skilled in the art, it is intended that this invention be limited only by the scope of the appended claims.

What is claimed is:

1. An improved process for the manufacture of cement clinker in a conventional long wet or dry inclined rotary kiln comprising a calcining zone and a clinkering zone, said improvement comprising the steps of
    (1) processing solid, high volatile fuel having a volatile content of more than about 40% into fuel elements, without containerization of the fuel, wherein said fuel elements are sufficiently large so as to retard and extend pyrolysis and combustion throughout the calcining zone and sufficiently small so as to result in substantially complete combustion before entering the clinkering zone; and
    (2) charging said uncontainerized fuel elements to the calcining zone of the kiln to provide from greater than about 70 to about 75% of the total fuel heat required for the cement manufacturing process.

2. The process of claim 1 wherein said solid, high volatile fuel has a volatile content of greater than about 50%.

3. The process of claim 1 wherein said solid, high volatile fuel has an ignition temperature of the volatile portion of about 300° F. or more and an ignition temperature of the non-volatile portions of about 750° F. or more.

4. The process of claim 1 wherein said solid, high volatile fuel has an ignition temperature of the volatile portion of from about 300° to 1000° F. and an ignition temperature of the non-volatile portions of from about 750° to 1500° F.

5. The process of claim 1 wherein said high volatile fuel is hazardous waste.

6. The process of claim 1 wherein said high volatile fuel is used rubber tires.

7. The process of claim 1 wherein said high volatile, low ignition temperature fuel provides from about 20 to about 50% of the heat required for the process.

8. The process of claim 7 wherein said conventional long wet or dry inclined rotary cement kiln is a dry process rotary cement kiln.

9. The process of claim 1 wherein the fuel elements are processed to weigh from about 5 to about 100 pounds and have a surface area to volume ratio of from about 50 $ft^{-1}$ to about 2 $ft^{-1}$.

10. The process of claim 1 wherein said high volatile fuel elements provides from greater than about 10 to about 60% of the heat required for the process.

11. The process of claim 1 wherein the fuel elements are prepared by sorting said elements from solid fuel not meeting the dimensional requirements of said fuel elements.

12. The process of claim 6 wherein the fuel elements are formed by compressing the rubber tires between opposite tread faces and retaining them in the resultant compressed shape.

13. The process of claim 12 wherein the rubber tires are filled with shredded rubber prior to the compressing step.

14. The process of claim 12 wherein the rubber tire fuel elements are coated with an ignition retardant prior to their delivery to the kiln.

15. The process of claim 1 wherein the fuel elements are charged into the kiln at a point in the kiln wherein the cement raw materials have a temperature of form about 1200° F. to about 1500° F.

16. The process of claim 1 wherein the fuel elements are derived from telephone poles, logs, or railroad ties, whose dimensions have been reduces so as to produce a fuel element having a surface area to volume ratio of about 50 $ft^{-1}$ to about 2 $ft^{-1}$.

17. The process of claim 1 wherein said high volatile fuel is agricultural wastes.

18. The process of claim 1 wherein said high volatile fuel is municipal waste.

19. The process of claim 12 wherein the rubber tires are filled with hazardous waste prior to the compressing step.

20. The process of claim 12 wherein the rubber tires are filled with agricultural wastes prior to the compressing step.

21. The process of claim 12 wherein the rubber tires are filled with municipal wastes prior to the compressing step.

22. In a continuous process for the manufacture of cement clinker comprising:
    introducing unsintered cement raw materials comprising calcium carbonate containing material, silica containing material, alumina containing material and iron containing material into an inclined rotary kiln comprising a plurality of treatment zones including a calcination zone and a clinkering zone;
    heating said raw materials in said calcination zone under conditions of agitation due to the rotation of said kiln at calcination temperatures ranging from about 1000° to about 2000° F., said calcination temperatures being below the temperature of incipient fusion of said cement materials to effect thermal decomposition of calcium carbonate with evolution of carbon dioxide;
    continuously transferring calcined material from said calcination zone into said clinkering zone;
    heating said calcined material in said clinkering zone at sintering temperatures ranging from about 2300° to about 2900° F., said sintering temperatures being at or above the temperature of incipient fusion of said calcined materials to effect clinkering; said heating in said rotary kiln being effected at least in part by the combustion of fuel so as to produce heated gases within said kiln;

the improvement comprising adding solid, high volatile fuel directly into the calcining zone of said kiln wherein, prior to addition into said calcining zone, said solid, high volatile fuel is dimensioned into fuel elements of from about 5 to about 100 pounds and have a surface area to volume ratio of from about 50 ft$^{-1}$ to about 2 ft$^{-1}$ and are added in sufficient amounts so as to provide from greater than about 10 to about 75 weight percent of the fuel heat required for the cement manufacturing process.

23. The process of claim 1 wherein said solid fuel is solid waste.

24. The process of claim 23 wherein said solid waste is dimensioned into fuel elements by compaction of said waste.

25. The process of claim 24 wherein the waste is mixed with a binding agent prior to compaction.

26. The process of claim 24 wherein the waste is mixed with an ignition retardant prior to compaction.

27. The process of claim 24 wherein the fuel elements are coated with an ignition retardant prior to their being charged into the kiln.

28. The process of claim 22 wherein said heated gases pass through the kiln and are allowed to exit the kiln at its feed end.

29. The process of claim 28 wherein said cement raw materials and the heated gases exiting said kiln are passed through a preheater system of one or more steps prior to introduction of the cement raw materials into said inclined rotary kiln to recover useful heat from the exhaust gases.

30. An improved process for the manufacture of cement clinker in a conventional long wet or dry inclined rotary kiln comprising a calcining zone and a clinkering zone, the improvement comprising the step of charging solid fuel having a volatile content of more than about 40% into the calcining zone of the kiln to provide greater than about 70 to about 75% of the fuel heat required for the cement manufacturing process, said volatile fuel having been processed, without containerization, into fuel elements dimensioned to have a surface area to volume ratio of about 50 ft$^{-1}$ to about 2 ft$^{-1}$.

* * * * *

UNITED STATES PATENT AND TRADEMARK OFFICE
CERTIFICATE OF CORRECTION

PATENT NO. : 5,156,676

DATED : 10/20/92

INVENTOR(S) : Garrett, et al.

It is certified that error appears in the above-identified patent and that said Letters Patent is hereby corrected as shown below:

Column 17, line 42, delete "about 70" and insert --greater than about 10--.

Column 18, line 15, following the words "shredded rubber" insert --selected from the group consisting of hazardous waste, agricultural waste and municipal waste--.

Column 18, line 22, delete "form" and insert --from--.

Column 20, line 19, delete "70" and insert --10--.

Signed and Sealed this

Twenty-second Day of March, 1994

Attest:

BRUCE LEHMAN

Attesting Officer          Commissioner of Patents and Trademarks